United States Patent

[11] 3,601,993

[72] Inventor Henri Bringer
26 Allee des Penitents, Vernon 27, France
[21] Appl. No. 24,993
[22] Filed Apr. 2, 1970
[45] Patented Aug. 31, 1971
[32] Priority Apr. 3, 1969
[33] France
[31] PV 6910190

[54] TURBOPUMP FOR ROCKET ENGINES
10 Claims, 3 Drawing Figs.
[52] U.S. Cl. .................................................. 60/240,
60/39.26, 60/39.27, 60/39.3
[51] Int. Cl. .................................................. F02k 3/00
[50] Field of Search .................................................. 60/240,
39.26, 39.27, 39.3

[56] References Cited
UNITED STATES PATENTS
2,728,192 12/1955 Ross .......................... 60/39.26 X
3,137,128 6/1964 Francais .......................... 60/240 X
3,215,352 11/1965 Meraz .......................... 60/240 UX
3,433,022 3/1969 Lovingham .......................... 60/240 X
3,527,056 9/1970 Hoffman .......................... 60/240 X

*Primary Examiner*—Clarence R. Gordon
*Attorney*—Waters, Roditi, Schwartz & Nissen

ABSTRACT: A turbopump is provided for a liquid-fuel rocket engine using two power propellants, namely a noncryogenic oxidizer and a noncryogenic fuel. The turbopump feeds the rocket engine at high pressure. The pump-driving turbine of the turbopump is fed by gases from a generator produced by the combustion of the two propellants and cooled by the injection of water. A regulator is connected between the generator and the propellant pumps of the turbopump to control the speed of the turbine in accordance with engine combustion pressure to maintain a substantially constant pressure. The propellants are fed to the engine injection via a balancing device which regulates the propellant delivery pressures so that they are equalized.

TURBOPUMP FOR ROCKET ENGINES

BRIEF SUMMARY OF THE INVENTION

The invention relates to turbopumps which include a turbine driving two pumps feeding a respective propellant to a rocket engine.

According to the invention the rocket-engine turbopump is characterized by a middle support dividing the turbopump into two approximately balanced parts, namely, the turbine casing and the pump chamber for the first propellant on the one hand, and on the other hand pump compartments respectively for the second propellant and water, the middle support being integral with the engine top plate and allowing direct inflow of the second propellant into the engine. A cardan joint is fitted on the top of the middle support for connecting the turbopump to the remaining structure of the device containing the fuel tanks, etc. Obviously, therefore, the flow of the propellants at high pressure between the turbopump and the extractor jet is as straight as possible.

According to one characteristic feature of the invention, two shinbone-type feed pipes (i.e. with a swivel joint at each end, one swivel joint being housed in the turbopump entry conduits so that these may have several degrees play in their seatings and the other able to slide in the fuel tank cylinders) provide connection between the turbopump and the fuel feed gates integral with said structure of the device and thus leave clearance for the engine around the cardan shaft. This simple construction replaces the well known feed pipes on existing rockets which bend out in all three directions and have bellow frames to allow them to yield to the clearance of the engine.

According to another characteristic feature of the invention, the cooling of the generator gases is by water. The pumps supply the propellants necessary for operating the generator, and a water pump supplies water for cooling the gases to a tolerable temperature for driving the turbine. Water is chosen in order to obtain neutral gases, allowing in addition the pressurization of the propellant tanks, essential in order to obviate cavitation in the pump.

This construction differs from those in other known devices where an additional fuel injection is employed for cooling the generator gases, which compels pressurizing the oxidizer tank by means of gases produced by a heat exchanger and this of course complicates the propelling unit.

According to a further characteristic feature of the invention, a regulator control equalizes the engine combustion pressure and a pilot pressure, determined in advance by a pressure regulator, by acting on the generator discharge in such a way that the discharges of the two propellants and of the water are controlled simultaneously.

Thus, whatever the pressure in the generator, the temperature of the gases remains steady. Furthermore, this control is not based on turbine speed, as is conventional, but on combustion jet pressure, which insures better thrust control, and this is a matter of extreme importance when dealing with an assemblage of several engines.

According to another characteristic feature of the invention, a balance regulator keeps the pressures of the two propellants at the same level before admission into the engine injector, so as to avoid the alteration of mixture ratio during flight, as would be occasioned by reduced pressures and accelerative increase.

DETAILED DESCRIPTION

Figure 1:
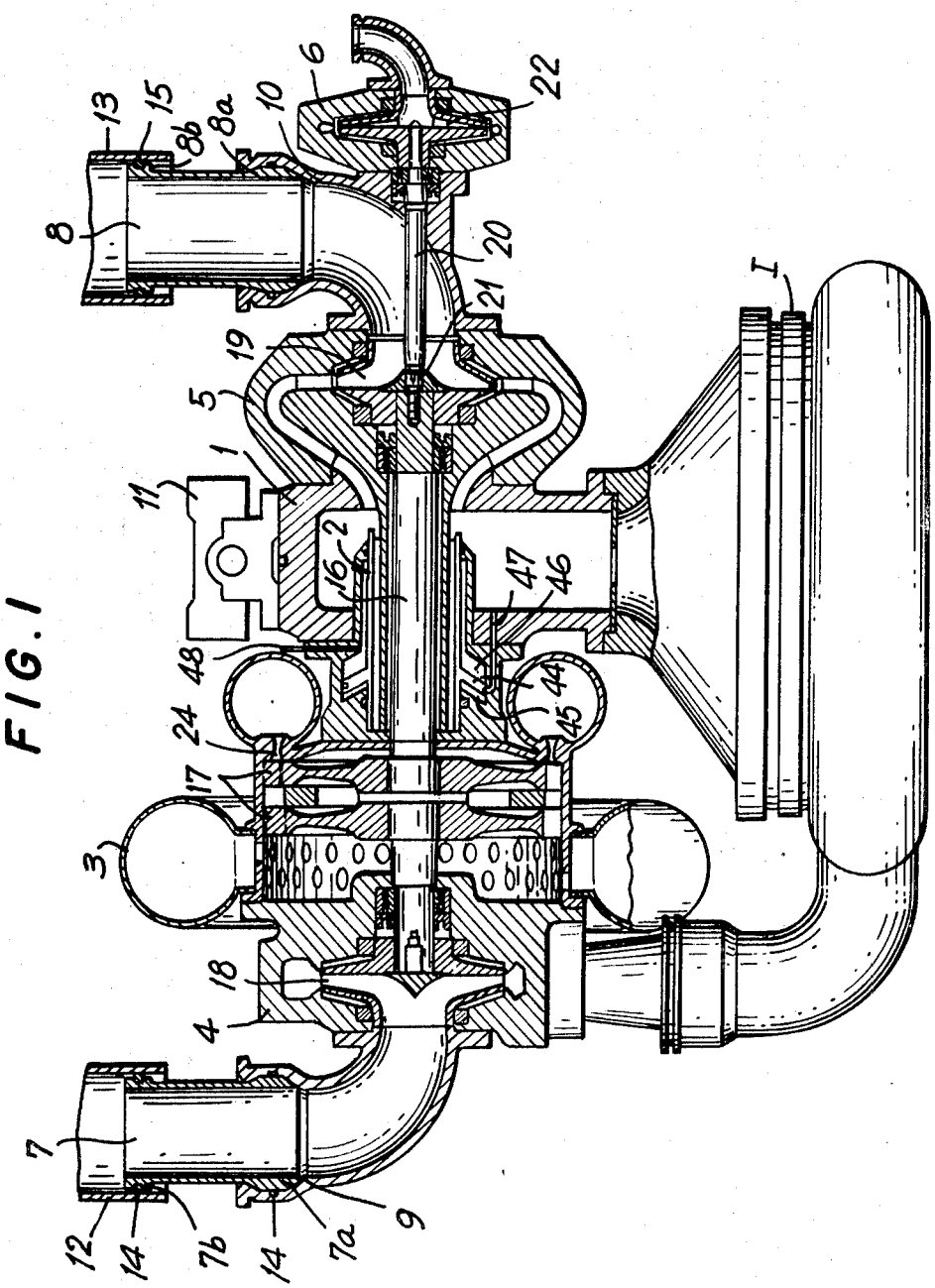
FIG. 1 is a longitudinal sectional view through a turbopump fitted at the top part of a rocket engine.
Figure 2:
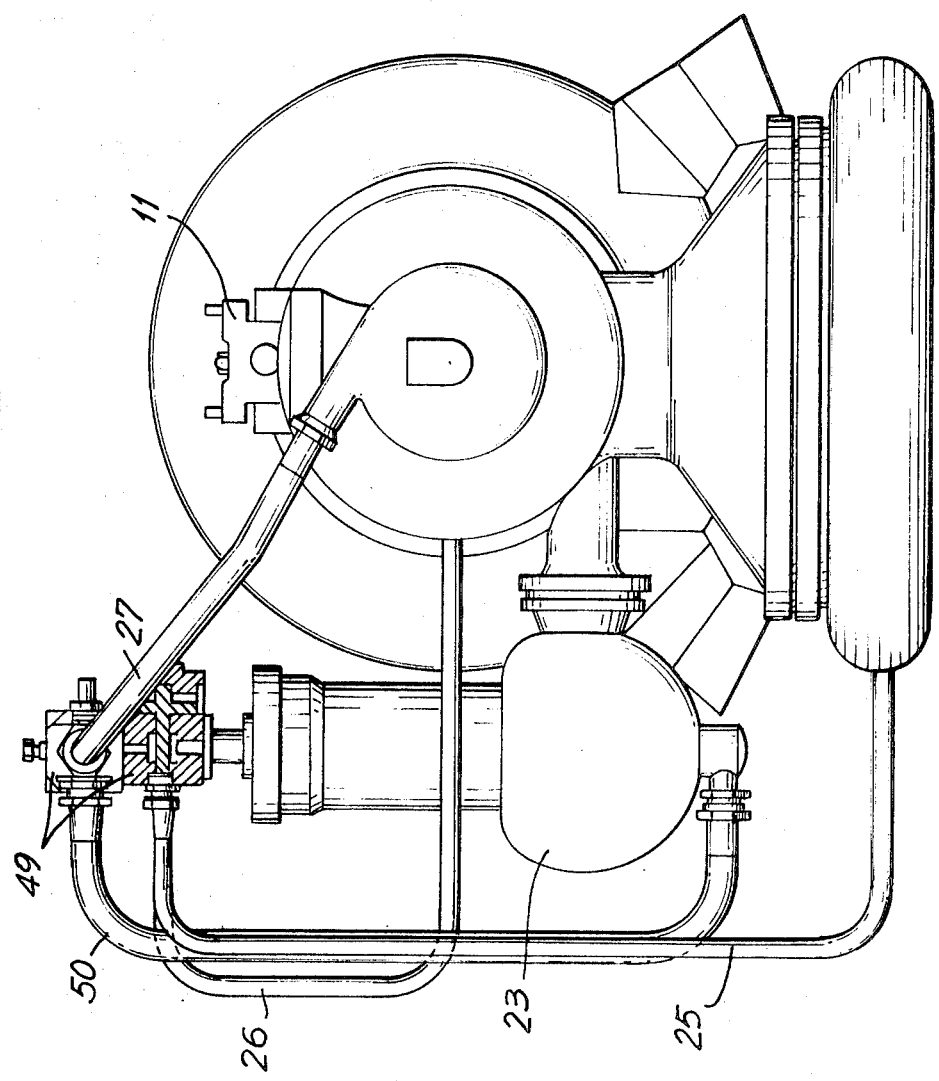
FIG. 2 is a side view thereof, partly in section.

The turbopump shown in FIGS. 1 and 2 is adapted to feed a rocket engine with two propellants, namely a noncryogenic oxidizer, and a noncryogenic fuel. The turbopump comprises a central support 1 secured with the top cover of the rocket engine. Aligned along a horizontal axis of support 1 on one side thereof are a balance regulator 2 fitted directly on the central support member 1, then a turbine casing 3 and finally a pump compartment 4 for one of the two propellants, and on the other side of the support member 1, a pump compartment 5 for the second propellant, and a water pump compartment 6 securely mounted on an entry conduit 10 for second propellant.

The propellants are fed to pump compartments 4 and 5 via pipes 7 and 8. These pipes include swivel joints 7a, 7b and 8a, 8b at their opposite ends. The swivel joints 7a, 8a are housed in entry conduits 9 and 10 on the turbopump and the swivels 7b, 8b can slide inside cylinders 12 and 13 leading to propellant tanks, thus allowing clearance around a cardan shaft 11 connecting the support member 1 to the tank structure. Leak-tightness in pipes 7 and 8 is provided by toroidal joints 14 and 15.

A main shaft 16 carries turbine wheels 17 and also wheels 18 and 19, housed respectively in compartments 4 and 5, of the pumps for the two propellants. A shaft 20 is coupled to main shaft 16 by a keyway 21 and carries a wheel 22 of the water pump 6 which directly feeds a gas generator 23 (FIG. 2).

The turbine is driven by the gases produced in the generator 23 and expanded in the nozzles 24.

For producing these gases, the propellants are tapped from pumps 4 and 5 and carried to generator 23 in respective pipelines 25 and 26. Water pump 6 feeds generator 23 through piping 27.

Before the propellants and water enter generator 23, they travel through a main regulator 49 (FIG. 3) comprised of three compartments 28, 29a and 29b. Compartment 28 is supplied with water; compartments 29a and 29b are in parallel side-by-side relation and are identical and each fed with one of the propellants Compartment 28 contains a piston 30 which divides a space into two chambers 31 and 32. Chamber 31 is pressurized at an initial preset value by a pilot pressure and chamber 32 is pressurized by the rocket engine combustion pressure. When the combustion pressure has not yet risen to the value of the pilot pressure, the piston 30 is in a position to the left in FIG. 3 and water can flow freely through admission inlet 33 to distribution chamber 34.

From there the water flows to generator 23 on the one hand through the piping 50, on the other hand the water pressure is exerted through channels 35a and 35b onto the front faces of pistons 36a and 36b housed in compartments 29a and 29b and dividing the compartments likewise into two chambers 37a, 38a and 37b, 38b. The two propellants enter through admission holes 39a and 39b into distribution chambers 40a and 40b and feed the injector of generator 23 through channels 41a and 41b. Furthermore, the pressures of the propellants are exerted through holes 42a and 42b on the rear faces of the pistons 36a and 36b.

Figure 3:
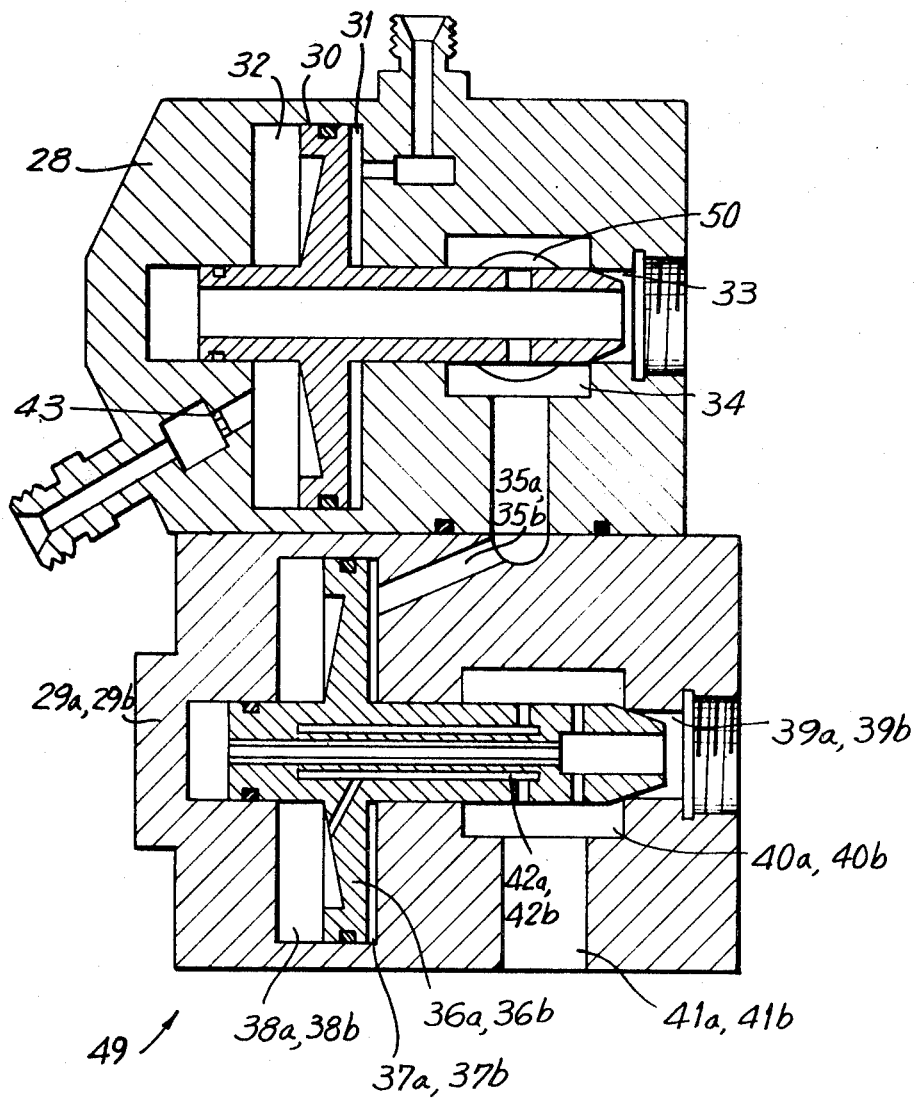
FIG. 3 is a sectional view on enlarged scale of a regulator of the turbopump.

When the rocket combustion pressure exceeds the pilot pressure, piston 30 is thrust to the right in FIG. 3 and more or less closes the admission inlet 33, thus lessening the water delivery and pressure.

As compartments 29a and 29b are hydraulically coupled to compartment 28, pistons 36a and 36b automatically follow and close the inlets 39a and 39b until a balance of the pressures on their front and rear faces is restored. Delivery of the two propellants and of the water is decreased, but their pressures on entry into the generator are perfectly in balance. Due to lower generator output, the turbine begins to slow down until the balance between the initial pilot pressure and the rocket pressure is established.

A diaphragm 43 of suitable diameter is arranged at the inlet of chamber 32 and serves to damp the adjustment vibrations. Furthermore, efficiency is improved by filling the chamber 32 and the tubing in front of the diaphragm with oil.

The balance regulator 2 housed in central support 1 serves to balance the pressures of the two propellants at the entry to the engine injector I to the same values. As a matter of fact changes of accelerations and pressure in flight involve a variation of outlet pressures and therefore of the mixture ratio.

The balance regulator 2 comprises a piston 44 dividing the regulator compartment into two chambers 45 and 46. The chamber 45 is supplied with propellant traveling through the central support 1 through channel 47, while chamber 46 is subject, through pipeline 48, to the pressure of the other propellant supplied by pump 18. If it is assumed that the pressure of the propellant supplied by pump 19 is slightly higher than that of the propellant supplied by pump 18, this higher pressure, exerted in chamber 45, pushes the piston to the right in FIG. 1, more or less closing the entry hole in the central support 1 and decreasing propellant delivery and pressure until a balance is established between the pressures on both sides of the piston 44. The opposite effect is achieved if the pressure of the propellant supplied by pump 19 is less than the pressure of the propellant supplied by pump 18. Thus, the pressures of the two propellants upon entry into the engine injector are balanced at the same level.

By allowing operation with a steady and the most favorable mixture ratio throughout the flight, this installation results in a considerable reduction of the weight of unburned gases, whereas with a variable mixture ratio the mass of unburned propellants is always high.

What is claimed is:

1. A turbopump for a rocket engine fed with two propellants, said turbopump comprising a central support member dividing the turbopump into two sections, one including a turbine casing and a pump compartment for the first propellant and the other including a pump compartment for the second propellant and a pump compartment for water, the central support member being coupled with the engine and allowing direct entry of the second propellant to the engine.

2. A turbopump according to claim 1 comprising a cardan suspension mounted on said central support member.

3. A turbopump according to claim 2 comprising two propellant feed tubes having opposite ends, each feed tube including a swivel joint at each of its ends, an entry conduit integral with each pump compartment and receiving a respective swivel joint so that the tube is rotatable in said entry conduit, the other swivel joints being slidably mounted in cylinders connected to propellant tanks, said feed tubes providing connection between the turbopump and the tanks while also providing clearance of the engine around the cardan joint.

4. A turbopump according to claim 1 comprising a generator coupled to said pump compartments to receive propellant therefrom and generate combustion gases, means for supplying water from the water pump compartment to said generator for cooling the gases produced by the generator and means for conveying the combustion gases from the generator to the turbine to drive the latter.

5. A turbopump as claimed in claim 4 comprising regulator means between said pump compartments and said generator for regulating flow of propellant to said generator in accordance with rocket engine combustion pressure.

6. A turbopump as claimed in claim 5, wherein said regulator means includes means for controlling delivery of propellant and means for pressurizing the latter means with water from the water compartment.

7. A turbopump according to claim 5, wherein said regulator means comprises first, second and third compartments fed respectively with water and the first and second propellants, a piston housed in a space in each compartment and dividing such space into front and rear chambers, a rod on each piston passing through a distribution chamber provided in each compartment and regulating flow through an inlet hole into such distribution chamber, the rear chamber of the first compartment being subjected to engine combustion pressure while the front chamber thereof is subject to an initial pilot pressure, means communicating the distribution chamber of the first compartment on the one hand with the generator and on the other hand with the two front chambers of the second and third compartments, means communicating the distribution chambers of the second and third compartments on one hand with the generator and on the other with the rear chambers of the respective compartments, whereby the engine combustion pressure is subordinated to the initial pilot pressure through action on the generator output by means of the three pistons in such a manner that the two propellants and the water are controlled simultaneously and assure a constant gas mixture ratio for driving the turbine.

8. A turbopump as claimed in claim 1 comprising balancing means coupled to the propellant pump compartments for controlling flow of propellant to the engine such that the pressure of the propellants delivered to the engine is equal.

9. A turbopump as claimed in claim 8, wherein said balancing means comprises a slidable piston with chambers on opposite sides thereof leading to respective propellant pump compartments, and means coupled to said piston for controlling the pressure of one of the propellants in accordance with the position of the piston so that the pressure of the propellants delivered to the engine will be equal.

10. A turbopump according to claim 1 including a balance regulator mounted on the central support member and having a compartment and a piston slidably mounted in the compartment and dividing the same into front and rear chambers, the rear chamber being fed with the second propellant and communicating through an aperture with the interior of the central support member, the front chamber being subjected to the pressure of the first propellant, said piston facing the entry aperture for the second propellant into the central support member to regulate pressure of the second propellant thereby ensuring equalization of the pressures of the two propellants fed to the engine to provide a constant mixture ratio in the engine combustion chamber.